(12) United States Patent  
Sano et al.

(10) Patent No.: US 8,516,801 B2
(45) Date of Patent: Aug. 27, 2013

(54) EXHAUST GAS PURIFYING APPARATUS FOR INTERNAL COMBUSTION ENGINE

(75) Inventors: Keisuke Sano, Susono (JP); Takaaki Itou, Mishima (JP); Kimikazu Yoda, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 589 days.

(21) Appl. No.: 12/530,237

(22) PCT Filed: Mar. 10, 2008

(86) PCT No.: PCT/JP2008/054294
§ 371 (c)(1),
(2), (4) Date: Sep. 8, 2009

(87) PCT Pub. No.: WO2008/126547
PCT Pub. Date: Oct. 23, 2008

(65) Prior Publication Data
US 2010/0132340 A1 Jun. 3, 2010

(30) Foreign Application Priority Data
Mar. 15, 2007 (JP) .................. 2007-066676

(51) Int. Cl.
*F01N 3/08* (2006.01)
*F01N 3/20* (2006.01)
*F01N 3/24* (2006.01)
*B01D 53/94* (2006.01)

(52) U.S. Cl.
USPC .................. 60/287; 60/288; 60/295

(58) Field of Classification Search
USPC ................ 60/287, 295, 288, 301
See application file for complete search history.

(56) References Cited

U.S. PATENT DOCUMENTS 5,307,627 A * 5/1994 Christensen et al. .......... 60/274
5,373,696 A * 12/1994 Adamczyk et al. ............. 60/276
6,018,943 A * 2/2000 Martin et al. .................. 60/274
6,378,298 B2 * 4/2002 Harima et al. ................. 60/288
2001/0002538 A1 * 6/2001 Katsuta et al. ................. 60/284

FOREIGN PATENT DOCUMENTS

| EP | 0 588 315 | 3/1994 |
| JP | 5-44446 | 2/1993 |
| JP | 2000-345832 | 12/2000 |
| JP | 2001-323811 | 11/2001 |
| JP | 2002-115538 | 4/2002 |
| JP | 2002-138820 | 5/2002 |
| JP | 2002-155736 | 5/2002 |
| JP | 2006-112313 | 4/2006 |
| JP | 2006-342700 | 12/2006 |

* cited by examiner

*Primary Examiner* — Kenneth Bomberg
*Assistant Examiner* — Dapinder Singh
(74) *Attorney, Agent, or Firm* — Finnegan, Henderson, Farabow, Garrett & Dunner, LLP

(57) ABSTRACT

An object of the present invention is to provide an exhaust gas purifying apparatus for an internal combustion engine which can properly purge at least NOx of unpurified components contained in exhaust gas while considering characteristics of NOx desorbed from an adsorbent. A bypass passage 18 bypassing a main exhaust passage 12 of the internal combustion engine 10 is provided. A HC/NOx adsorbent 22 having a function of adsorbing HC and NOx is provided in the bypass passage 18. A second underfloor catalyst 30 is provided downstream of the adsorbent 22. A purge passage 26 branching off from the bypass passage 18 while connecting to an intake passage is provided. An exhaust switching valve 20 and a purge control valve 28 are provided as a flow path switching means that is capable of switching a flow target into which the exhaust gas flows between the main exhaust passage 12 and the bypass passage 18. If the purging operations are executed, the intake purging operation is first executed. After that, the intake purging operation is switched to the exhaust purging operation at a timing existing after the purge of NOx is completed and at the time point at which the temperature of the adsorbent becomes stable.

12 Claims, 4 Drawing Sheets

(A) Adsorbing operation (B) Intake purging operation (C) Exhaust purging operation

EXHAUST GAS PURIFYING APPARATUS FOR INTERNAL COMBUSTION ENGINE

CROSS-REFERENCE TO RELATED APPLICATIONS

This application is a national phase application of International Application No. PCT/JP2008/054294, filed Mar. 10, 2008, and claims the priority of Japanese Application No. 2007-066676, filed Mar. 15, 2007, the contents of both of which are incorporated herein by reference.

TECHNICAL FIELD

The present invention relates to an exhaust gas purifying apparatus for an internal combustion engine, and more particularly to an exhaust gas purifying apparatus including an adsorbent that is placed in an exhaust passage for adsorbing unpurified components that cannot be purified by the catalyst.

BACKGROUND ART

An apparatus for purifying exhaust gas for an internal combustion engine equipped with an HC adsorbent, which is capable of adsorbing HC and moisture contained in the exhaust gas and which is disposed in a bypass passage bypassing a main exhaust passage, has been disclosed in the past, for example, by Patent Document 1. The conventional exhaust gas purifying apparatus supplies the exhaust gas into the bypass passage at the cold start to adsorb HC and the moisture by the HC adsorbent, thereby preventing HC that cannot be purified by a catalyst before the catalyst is activated from being released into the atmosphere. Furthermore, the conventional exhaust gas purifying apparatus, after the warm-up of the catalyst is completed, supplies hot exhaust gas into the HC adsorbent to desorb HC and the moisture from the HC adsorbent. As a result, HC and the moisture are flown back into an intake system.

In addition, the conventional exhaust gas purifying apparatus switches a flow target into which the exhaust gas flows between the main exhaust passage and the bypass passage on the basis of a temperature of the exhaust gas at a downstream side of the HC adsorbent.

Including the above-mentioned document, the applicant is aware of the following documents as a related art of the present invention.
[Patent Document 1] Japanese Laid-open Patent Application Publication No. 2002-138820
[Patent Document 2] Japanese Laid-open Patent Application Publication No. 2000-345832

DISCLOSURE OF INVENTION

Problem to be Solved by the Invention

As described above, the conventional exhaust gas purifying apparatus flows HC and the moisture desorbed from the HC adsorbent back into the intake system (intake purge). However, an amount of the desorbed gas flowing back into the intake system is subject to a limitation because there is a need for suppressing a variation in combustion of the internal combustion engine. Therefore, it is extremely difficult, only by executing the intake purge, to desorb unpurified components such as NOx and HC completely from the adsorbent.

In addition to the intake purge, as a method for processing the desorbed gas including the unpurified components desorbed from the adsorbent, there is an exhaust purge for flowing the desorbed gas back into an upstream portion of a catalyst placed in an exhaust passage. According to such exhaust purge, a greater amount of the exhaust gas than that during the intake purge can be supplied to the adsorbent because the exhaust purge does not exert any harmful influence on combustion.

On the other hand, an adsorbent having a function of adsorbing NOx, when the exhaust gas is supplied to the adsorbent for the purpose of desorbing NOx from the adsorbent, has a characteristic that NOx is likely to desorb rapidly by moisture vapor contained in the exhaust gas. For this reason, if a great amount of the exhaust gas is supplied to the adsorbent using the exhaust purge without discretion for the purpose of desorbing NOx and the like completely from the adsorbent, an amount of NOx that cannot cope within a purification capability of the catalyst is desorbed from the adsorbent and supplied to the catalyst. As a result, exhaust emission is deteriorated.

The present invention has been made to solve the above problem. It is an object of the present invention to provide an exhaust gas purifying apparatus for an internal combustion engine which can properly purge at least NOx of unpurified components contained in exhaust gas, while considering characteristics of NOx desorbed from an adsorbent.

Means for Solving the Problem

A first aspect of the present invention is an exhaust gas purifying apparatus for an internal combustion engine, the apparatus comprising:
a main exhaust passage through which exhaust gas exhausted from the internal combustion engine flows;
a bypass passage branching off from the main exhaust passage at an upstream connecting portion connected to the main exhaust passage while merging again with the main exhaust passage at a downstream connecting portion provided downstream of the upstream connecting portion;
flow path switching means that is capable of switching a flow target into which the exhaust gas flows between the main exhaust passage and the bypass passage;
an adsorbent that is disposed in the bypass passage and has a function of adsorbing at least NOx of unpurified components contained in the exhaust gas;
a purge passage branching off from the bypass passage while connecting to an intake passage of the internal combustion engine;
intake purge execution means for controlling the flow path switching means so that part of the exhaust gas exhausted from the internal combustion engine is supplied from the main exhaust passage to the bypass passage and then passes through the adsorbent and then flows back into the intake passage via the purge passage; and
purging operation execution means for executing a purging operation using the intake purge execution means in at least part of a period during which a significant desorption of NOx from the adsorbent occurs.

A second aspect of the present invention is an exhaust gas purifying apparatus for an internal combustion engine, the apparatus comprising:
a main exhaust passage through which exhaust gas exhausted from the internal combustion engine flows;
a bypass passage branching off from the main exhaust passage at an upstream connecting portion connected to the main exhaust passage while merging again with the main exhaust passage at a downstream connecting portion provided downstream of the upstream connecting portion;

flow path switching means that is capable of switching a flow target into which the exhaust gas flows between the main exhaust passage and the bypass passage;

an adsorbent that is disposed in the bypass passage and has a function of adsorbing at least NOx of unpurified components contained in the exhaust gas;

a purge passage branching off from the bypass passage while connecting to an intake passage of the internal combustion engine;

intake purge execution means for controlling the flow path switching means so that part of the exhaust gas exhausted from the internal combustion engine is supplied from the main exhaust passage to the bypass passage and then passes through the adsorbent and then flows back into the intake passage via the purge passage;

a catalyst that is disposed in the main exhaust passage and capable of purifying the exhaust gas;

exhaust purge execution means for controlling the flow path switching means so that part or all of the exhaust gas exhausted from the internal combustion engine is supplied from the main exhaust passage to the bypass passage and then passes through the catalyst after passing through the adsorbent; and purging operation switching means for executing a purging operation using the intake purge execution means and then switching the purging operation using the intake purge execution means to an purging operation using the exhaust purge execution means after a point in time when a significant desorption of NOx from the adsorbent is completed.

A third aspect of the present invention is an exhaust gas purifying apparatus for an internal combustion engine, the apparatus comprising:

a main exhaust passage through which exhaust gas exhausted from the internal combustion engine flows;

a bypass passage branching off from the main exhaust passage at an upstream connecting portion connected to the main exhaust passage while merging again with the main exhaust passage at a downstream connecting portion provided downstream of the upstream connecting portion;

flow path switching means that is capable of switching a flow target into which the exhaust gas flows between the main exhaust passage and the bypass passage;

an adsorbent that is disposed in the bypass passage and has a function of adsorbing HC and NOx contained in the exhaust gas;

a purge passage branching off from the bypass passage while connecting to an intake passage of the internal combustion engine;

intake purge execution means for controlling the flow path switching means so that part of the exhaust gas exhausted from the internal combustion engine is supplied from the main exhaust passage to the bypass passage and then passes through the adsorbent and then flows back into the intake passage via the purge passage; and purging operation execution means for executing a purging operation using the intake purge execution means in at least part of a period during which a significant desorption of NOx from the adsorbent occurs.

A fourth aspect of the present invention is an exhaust gas purifying apparatus for an internal combustion engine, the apparatus comprising:

a main exhaust passage through which exhaust gas exhausted from the internal combustion engine flows;

a bypass passage branching off from the main exhaust passage at an upstream connecting portion connected to the main exhaust passage while merging again with the main exhaust passage at a downstream connecting portion provided downstream of the upstream connecting portion;

flow path switching means that is capable of switching a flow target into which the exhaust gas flows between the main exhaust passage and the bypass passage;

an adsorbent that is disposed in the bypass passage and has a function of adsorbing HC and NOx contained in the exhaust gas;

a purge passage branching off from the bypass passage while connecting to an intake passage of the internal combustion engine;

intake purge execution means for controlling the flow path switching means so that part of the exhaust gas exhausted from the internal combustion engine is supplied from the main exhaust passage to the bypass passage and then passes through the adsorbent and then flows back into the intake passage via the purge passage;

a catalyst that is disposed in the main exhaust passage and capable of purifying the exhaust gas;

exhaust purge execution means for controlling the flow path switching means so that part or all of the exhaust gas exhausted from the internal combustion engine is supplied from the main exhaust passage to the bypass passage and then passes through the catalyst after passing through the adsorbent; and purging operation switching means for executing a purging operation using the intake purge execution means and then switching the purging operation using the intake purge execution means to an purging operation using the exhaust purge execution means after a point in time when a significant desorption of NOx from the adsorbent is completed.

A fifth aspect of the present invention is the exhaust gas purifying apparatus for the internal combustion engine according to any one of the first to the fourth aspects of the present invention, the apparatus further comprising:

moisture amount estimation means for estimating a moisture amount supplied to the adsorbent during a purging operation; and NOx significant desorption judgment means for judging the significant desorption of NOx from the adsorbent based on the moisture amount estimated by the moisture amount estimation mean.

A sixth aspect of the present invention is the exhaust gas purifying apparatus for the internal combustion engine according to the third aspect of the present invention, the apparatus further comprising:

adsorbent temperature acquisition means for acquiring a temperature of the adsorbent;

wherein the purging operation execution means includes purging operation continuance means for continuing the purging operation using the intake purge execution means until the temperature of the adsorbent becomes stable.

A seventh aspect of the present invention is the exhaust gas purifying apparatus for the internal combustion engine according to the fourth aspect of the present invention, the apparatus further comprising:

adsorbent temperature acquisition means for acquiring a temperature of the adsorbent;

wherein the purging operation switching means includes purge switching restriction means for restricting the switching to the purging operation using the exhaust purge execution means until the temperature of the adsorbent becomes stable.

An eighth aspect of the present invention is the exhaust gas purifying apparatus for the internal combustion engine according to the third aspect of the present invention, the apparatus further comprising:

a catalyst that is disposed in the main exhaust passage provided downstream of the downstream connecting portion and capable of purifying the exhaust gas;

wherein the purging operation execution means includes purging operation continuance means for continuing the purging operation using the intake purge execution means until an HC purification capability of the catalyst becomes able to be exerted.

A ninth aspect of the present invention is the exhaust gas purifying apparatus for the internal combustion engine according to the fourth aspect of the present invention, wherein the catalyst is disposed in the main exhaust passage provided downstream of the downstream connecting portion; and wherein the purging operation switching means includes purging operation restriction means for restricting the switching to the purging operation using the exhaust purge execution means until an HC purification capability of the catalyst becomes able to be exerted.

A tenth aspect of the present invention is the exhaust gas purifying apparatus for the internal combustion engine according to the seventh aspect of the present invention, wherein the purging operation switching means includes forcible purge execution means for switching to the purging operation using the exhaust purge execution means when total intake air amount totaled from start of a purging operation, total intake purge amount, or both exceeds a predetermined value, even if the temperature of the adsorbent has not yet been stable.

ADVANTAGES OF THE INVENTION

According to the first aspect of the present invention, the purging operation using the intake purge execution means (hereinafter "intake purging operation") is executed in at least part of the period during which the significant desorption of NOx from the adsorbent occurs. When the intake purging operation is executed, an amount of the exhaust gas supplied to the adsorbent is restricted for the sake of consideration for influence on combustion. At the same time, an amount of the moisture supplied to the adsorbent is also restricted. Accordingly, the occurrence of the NOx significant desorption is suppressed. Thus, the present invention makes it possible to preferably suppress that an amount of NOx released into the atmosphere increases due to the NOx significant desorption occurring if the moisture is supplied to the adsorbent during the purging operation.

The second aspect of the present invention switches the intake purging operation to the purging operation using the exhaust purge execution means (hereinafter "exhaust purging operation") after the point in time when the significant desorption of NOx from the adsorbent is completed. Thus, the present invention makes it possible to preferably suppress that an amount of NOx released into the atmosphere increases due to the NOx significant desorption, because the intake purging operation is executed in the period during which the significant desorption of NOx occurs.

According to the third aspect of the present invention, the advantages of the first aspect of the present invention are provided in the exhaust gas purifying apparatus for the internal combustion engine equipped with the adsorbent having a function of adsorbing HC and NOx.

According to the fourth aspect of the present invention, the advantages of the second aspect of the present invention are provided in the exhaust gas purifying apparatus for the internal combustion engine equipped with the adsorbent having a function of adsorbing HC and NOx.

Replacing NOx by the moisture supplied to the adsorbent facilitates the desorption of NOx. The fifth aspect of the present invention, based on the moisture amount, can properly judge the NOx significant desorption occurring if the moisture is supplied to the adsorbent during the purging operation.

The desorption amount of HC is proportional to the temperature of the adsorbent. For this reason, the desorption amount of HC increases with an increase of the adsorbent temperature until the adsorbent temperature becomes stable, while the desorption amount of HC goes into a decline after the adsorbent temperature becomes stable. In addition, the intake purging operation can purify NOx and HC desorbed with a purification rate of approximately one hundred percent. To desorb HC promptly while preferably purifying HC and NOx, it is preferred that the intake purging operation be continued until the time point at which the adsorbent temperature becomes stable comes. Thus, the sixth aspect of the present invention makes it possible to optimize an execution time of the intake purging operation. Further, the seventh aspect of the present invention makes it possible to optimize a timing for switching the intake purging operation to the exhaust purging operation.

According to the eighth or ninth aspect of the present invention, it is possible to prevent HC desorbed from the adsorbent from being released into the atmosphere without being purified by the catalyst placed downstream of the adsorbent.

The tenth aspect of the present invention can avoid the operation of the internal combustion engine from stopping before the purging operations are completed, thereby avoiding HC and NOx from being not adsorbed adequately by the adsorbent during the next cold start.

Figure 1:
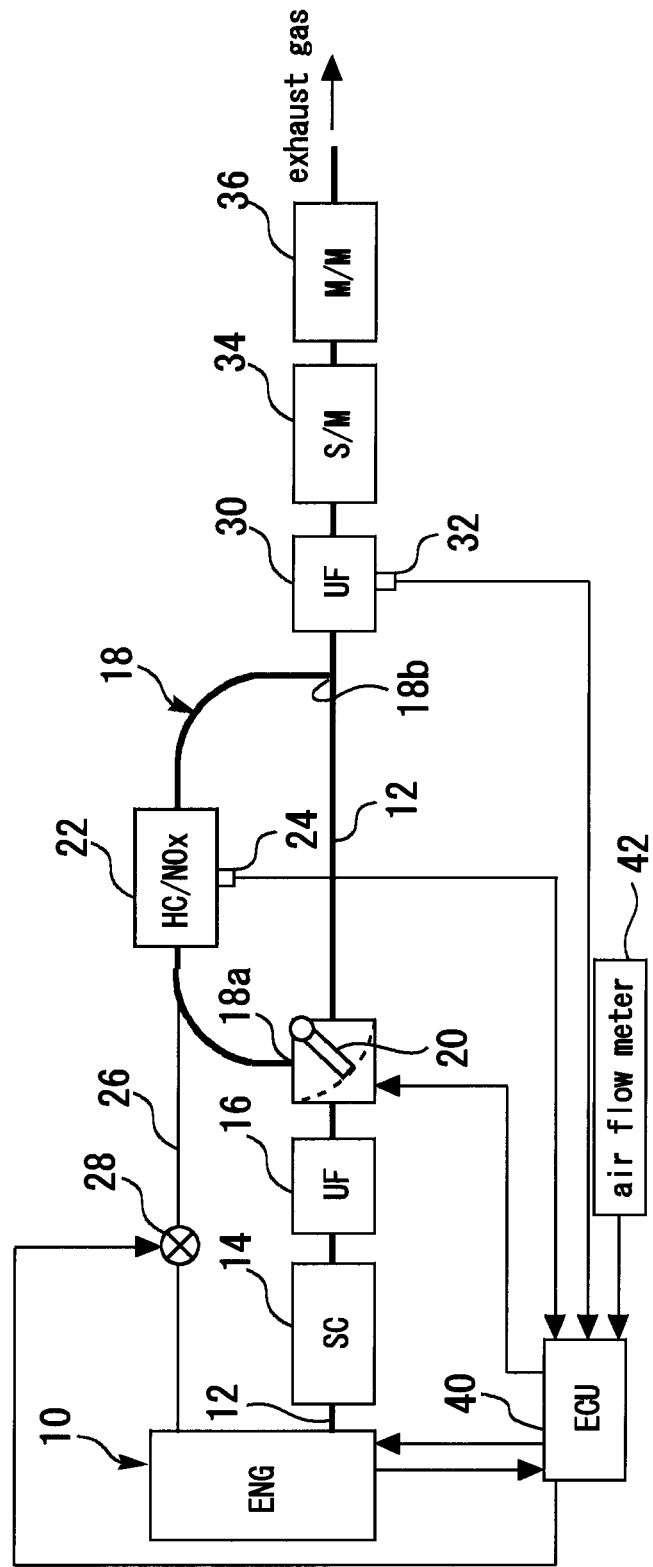
FIG. 1 is a diagram for explaining a configuration of an internal combustion engine system having an exhaust gas purifying apparatus according to a first embodiment of the present invention.

DESCRIPTION OF SYMBOLS 10 internal combustion engine
12 main exhaust passage
14 front stage catalyst (SC)
16 first underfloor catalyst (UF)
18 bypass passage
18a upstream connecting portion
18b downstream connecting portion
20 exhaust switching valve
22 HC/NOx adsorbent
24 temperature sensor
26 purge passage 28 purge control valve
30 second underfloor catalyst (UF)
32 catalyst temperature sensor
40 Electronic Control Unit (ECU)
42 air flow meter

BEST MODE FOR CARRYING OUT THE
INVENTION

First Embodiment

[Description of System Configuration]

FIG. 1 is a diagram for explaining a configuration of an internal combustion engine system having an exhaust gas purifying apparatus according to a first embodiment of the present invention. The internal combustion engine 10 shown in FIG. 1 includes an intake passage (not shown) for taking air into a cylinder, and an exhaust passage through which exhaust gas exhausted from the cylinder flows.

The exhaust passage of the present embodiment includes a main exhaust passage 12 for exhausting the exhaust gas from the cylinder, and a bypass passage 18 described later. In the main exhaust passage 12, a front stage catalyst (SC) 14 and first underfloor catalyst (UF) 16 that can purify the exhaust gas is placed in series in order from the upstream side.

The system of the present embodiment has the bypass passage 18 as a passage bypassing the main exhaust passage 12. The bypass passage 18 is configured to branch off from the main exhaust passage 12 at an upstream connecting portion 18a placed downstream of the first underfloor catalyst 16, and merge again with the main exhaust passage 12 at a downstream connecting portion 18b placed downstream of the upstream connecting portion 18a. The upstream connecting portion 18a is provided with an exhaust switching valve 20 for switching a flow target into which the exhaust gas flows between the main exhaust passage 12 and the bypass passage 18.

The middle of the bypass passage 18 is provided with an HC/NOx adsorbent 22 having a function of adsorbing HC and NOx contained in the exhaust gas. Zeolitic materials which support iron Fe, for example, can be used as such HC/NOx adsorbent 22. In addition, into the HC/NOx adsorbent 22, a temperature sensor 24 is integrated to detect a temperature of the HC/NOx adsorbent 22.

A part between the upstream connecting portion 18a and HC/NOx adsorbent 22 in the bypass passage 18 communicates with a purge passage 26. A purge control valve 28 is provided in the middle of the purge passage 26. The remaining end of the purge passage 26 communicates with the intake passage.

In addition, in the main exhaust passage 12 provided downstream of the downstream connecting portion 18b, a second underfloor catalyst (UF) 30 that can purify the exhaust gas is placed. Into the second underfloor catalyst 30, a catalyst temperature sensor 32 is integrated to detect a temperature of the catalyst. Incidentally, in the main exhaust passage 12 provided downstream of the second underfloor catalyst 30, a sub muffler 34 and a main muffler 36 are placed in series in order from the upstream side.

The system of the present embodiment includes an electronic control unit (ECU) 40. An air flow meter 42 for measuring the amount of the air taken into the internal combustion engine 10 is connected to the ECU 40, as well as various sensors for controlling the internal combustion engine 10 and the above temperature sensor 24. In addition, various actuators such as the exhaust switching valve 20 and the purge control valve 28 mentioned above are connected to the ECU 40.

Figure 2:
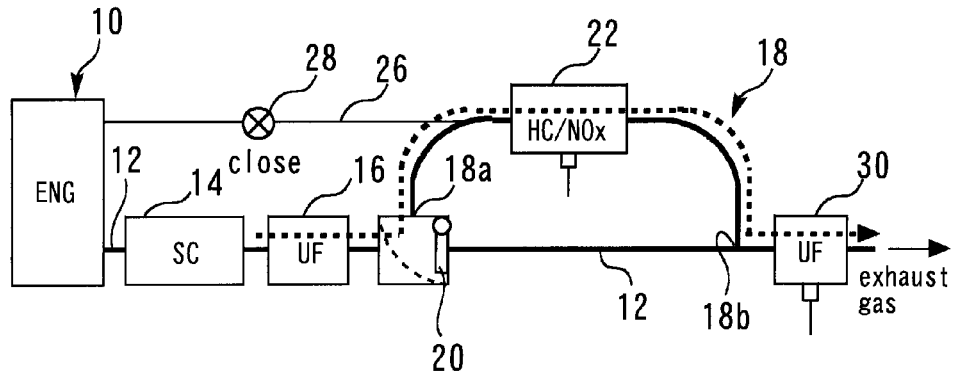
FIG. 2 is a diagram for explaining an operation of the system according to the first embodiment of the present invention.
Figure 2:
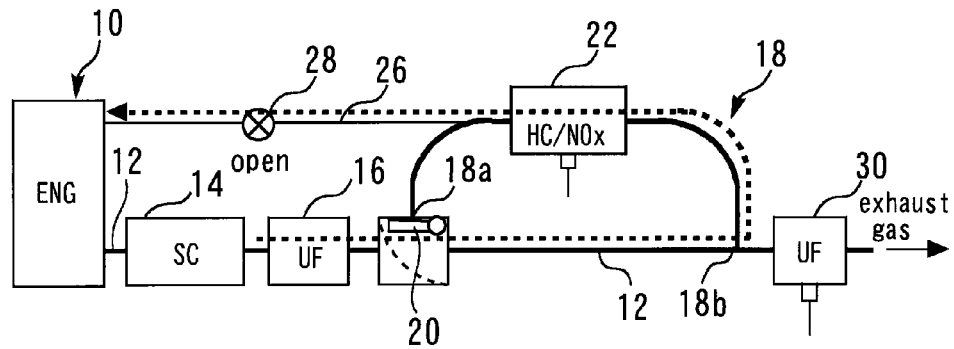
Figure 2:
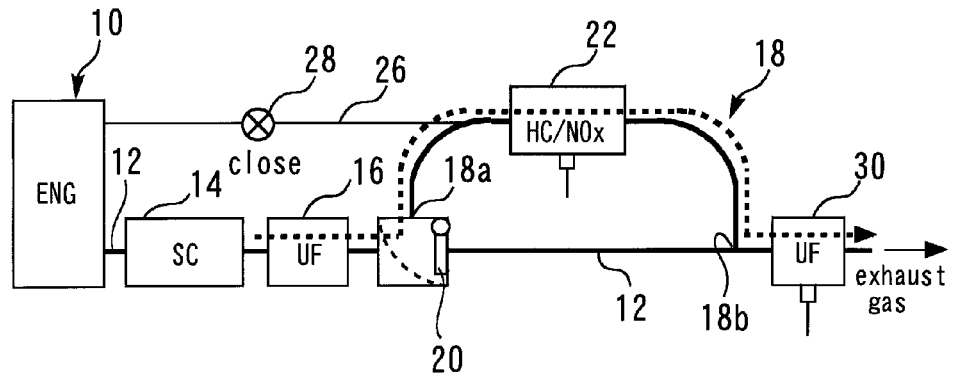

FIG. 2 is a diagram for explaining an operation of the system according to the first embodiment of the present invention.

[Adsorbing Operation]

First, with reference to FIG. 2(A), an operation for causing the HC/NOx adsorbent 22 to adsorb unpurified components (HC and NOx) contained in the exhaust gas exhausted from the cylinder at the cold start of the internal combustion engine 10 will be described.

As shown in FIG. 2(A), the adsorbing operation is started in a state where the exhaust switching valve 20 blocks the main exhaust passage 12 at the cold start of the internal combustion engine 10. In addition, the purge control valve 28 is controlled to become a closed condition under the adsorbing operation.

In the state mentioned above, all of the exhaust gas exhausted from the internal combustion engine 10 is supplied from the main exhaust passage 12 into the bypass passage 18 via the upstream connecting portion 18a. The exhaust gas supplied into the bypass passage 18 passes through the HC/NOx adsorbent 22 and is then returned to the main exhaust passage 12 and is then released into the atmosphere.

According to the adsorbing operation described above, HC and NOx contained in the exhaust gas are adsorbed by the HC/NOx adsorbent 22 and removed. This can prevent HC and NOx from being released into the atmosphere at the cold start when the front stage catalyst 14 or the like has not yet been activated.

[Purging Operation]

FIGS. 2(B) and 2(C) are diagrams for explaining a purging operation according to the present embodiment including an intake purging operation and an exhaust purging operation.

(Intake Purging Operation)

First, with reference to FIG. 2(B), the intake purging operation for purging (desorbing) HC and NOx, which are adsorbed by the HC/NOx adsorbent 22 at a cold condition, from the HC/NOx adsorbent 22. Incidentally, in this description, the purging operation performed by using a technique which allows HC and NOx adsorbed by the HC/NOx adsorbent 22 to be desorbed from the adsorbent 22 and which then flows HC and NOx back into the intake passage via the purging passage 26 is referred to as the "intake purging operation".

As shown in FIG. 2(B), the intake purging operation is started by controlling the exhaust switching valve 20 to block the bypass passage 18 and by opening the purge control valve 28, after a predetermined purge start timing has come (for example, the front stage catalyst 14 has been activated). According to such intake purging operation, part of the exhaust gas exhausted from the cylinder is supplied from the main exhaust passage 12 into the bypass passage 18 via the downstream connecting portion 18b, by using a vacuum being generated in the intake passage of the internal combustion engine 10.

As a result, the exhaust gas relatively heated after the start is supplied to the HC/NOx adsorbent 22. Accordingly, HC and NOx are desorbed from the HC/NOx adsorbent 22 and purged to the intake passage via the purge passage 26. HC and NOx returned to the intake passage are burned again and then purified by the active front stage catalyst 14, the active underfloor catalyst 16, or the like. In this way, such intake purging operation mentioned above can certainly purify HC and NOx adsorbed by the HC/NOx adsorbent 22 at the cold condition.

(Exhaust Purging Operation)

As shown in FIG. 2(C), the operation for purifying the desorbed gas (purged gas) containing HC and NOx desorbed from the HC/NOx adsorbent 22 by supplying the gas to the second underfloor catalyst 30 is herein referred to as the "exhaust purging operation".

The system of the present embodiment is characterized in a timing at which the intake purging operation switches to the exhaust purging operation. The exhaust purging operation is started when the characteristic timing of the present embodiment described later has come. As shown in FIG. 2(C), the purging operation is started when the exhaust switching valve 20 is controlled in such a way that the bypass passage 18 is opened, in a state where the purge control valve 28 is closed.

According to the exhaust purging operation described above, the exhaust gas is supplied in the same direction as that during the intake purging operation shown in FIG. 2(A). As a result, adsorbed components (mainly HC) that cannot be removed during the intake purging operation but remains in the HC/NOx adsorbent 22, can be desorbed from the HC/NOx adsorbent 22 using the exhaust gas which is high temperature and a great amount relative to that during the intake purging operation. After that, the exhaust gas including the desorbed HC and NOx passes through the second underfloor catalyst 30 and is then purified. The above exhaust purge can supply the HC/NOx adsorbent 22 with the exhaust gas which is high temperature and a great amount relative to that during the intake purge and can fully desorb HC and NOx from the HC/NOx adsorbent 22.

Feature Portions of the First Embodiment (Desorption Behavior of NOx and HC During the Exhaust Purging Operation)

Figure 3:
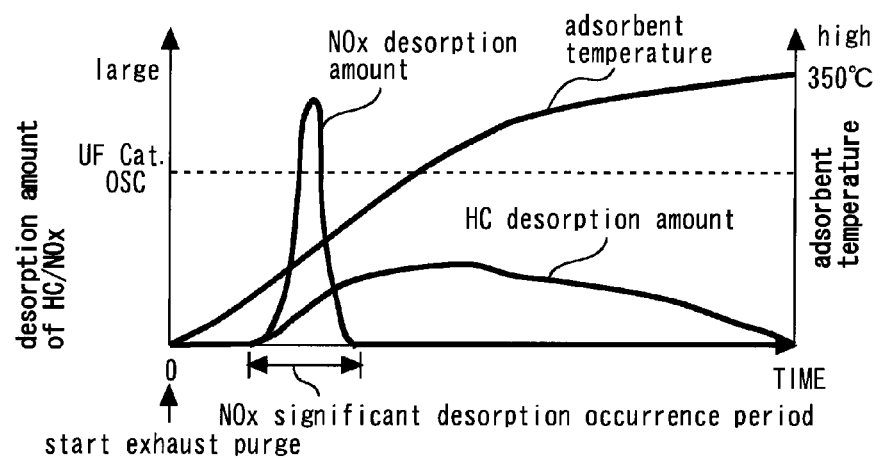
FIG. 3 is a diagram for showing a desorption behavior of NOx and HC existing if an exhaust purge is selected when a predetermined purging operation is started after an adsorbing operation is terminated.

FIG. 3 is a diagram for showing a desorption behavior of NOx and HC existing if the exhaust purge is selected when a predetermined purging operation is started after the adsorbing operation is terminated. First, a desorption behavior of HC is described. When the exhaust purge is performed, as shown in FIG. 3, a desorption amount of HC from the HC/NOx adsorbent 22 increases with a rise in temperature of the HC/NOx adsorbent 22. After that, the desorption amount of HC starts to decrease after reaching peak value. The desorption of HC is completed when the temperature of the HC/NOx adsorbent 22 reaches a temperature (350 degrees Celsius or so) at which HC is perfectly desorbed. In this way, the desorption amount of HC from the HC/NOx adsorbent 22 is proportional to the temperature of the HC/NOx adsorbent 22.

Next, a desorption behavior of NOx is described. A desorption amount of NOx is also proportional to the temperature of the HC/NOx adsorbent 22 as in the case of HC, if moisture is not contained in a gas supplied to the HC/NOx adsorbent 22 during a purge operation. However, approximately fourteen percent in volume concentration of the exhaust gas exhausted from the cylinder is the moisture. The HC/NOx adsorbent 22 has a characteristic that NOx is likely to desorb from the adsorbent 22 if the moisture is supplied thereto, because NOx is replaced by the moisture if the moisture is supplied thereto. Therefore, the desorption amount of NOx is determined due to a supply amount of the moisture to the HC/NOx adsorbent 22.

More specifically, according to the exhaust purge, if all of the exhaust gas containing a certain percentage of moisture is supplied to the HC/NOx adsorbent 22, as shown in FIG. 3, NOx adsorbed in the HC/NOx adsorbent 22 is replaced by the moisture at a burst, and NOx with high peak value desorbs from the HC/NOx adsorbent 22 rapidly. In the present description, a period during which NOx desorbs from the HC/NOx adsorbent 22 rapidly in response to supplying the HC/NOx adsorbent 22 with the exhaust gas containing the certain percentage of moisture as just described, is herein referred to as a "NOx significant desorption occurrence period".

The front stage catalyst 14 and the underfloor catalysts 16, 30 disposed in the main exhaust passage 12 of the internal combustion engine 10 have an oxygen storage capacity (OSC) and can store oxygen inside the catalysts within the oxygen storage capacity. If the catalysts 14 are functional, NOx supplied to the catalysts 14 and the like are purified by being decomposed into oxygen and nitrogen and purified.

The line designated "UF Cat.OSC" in FIG. 3 represents a level of the desorption amount, which is capable of purifying by the second underfloor catalyst 30, of NOx which is desorbed from the HC/NOx adsorbent 22 by the exhaust purge. When the significant desorption of NOx shown in FIG. 3 rapidly occurs by supplying the HC/NOx adsorbent 22 with all of the exhaust gas exhausted from the cylinder by the exhaust purge, an amount of NOx that cannot cope within the oxygen storage capacity which the second underfloor catalyst 30 has, is temporarily supplied to the catalyst 30. As a result, NOx desorbed from the HC/NOx adsorbent 22 becomes unable to be completely purified by the second underfloor catalyst 30. Consequently, exhaust emission is deteriorated.

(Desorption Behavior of NOx and HC During the Intake Purge)

Figure 4:
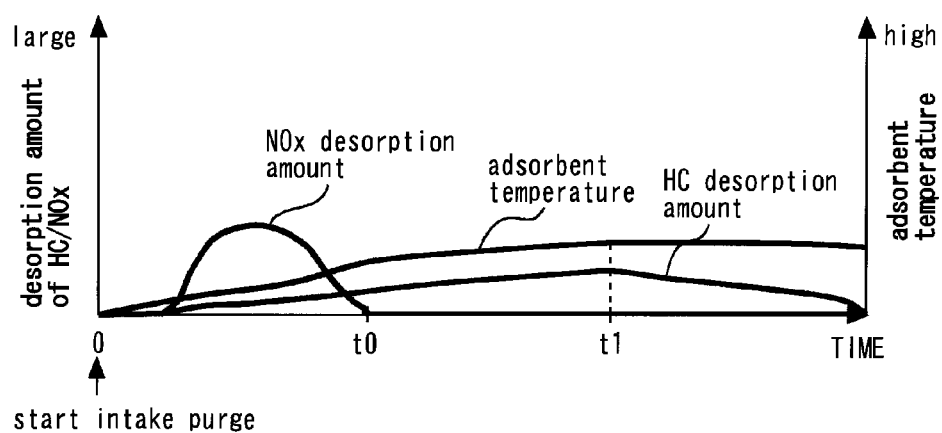
FIG. 4 is a diagram for showing a desorption behavior of NOx and HC existing if an intake purge is selected when a predetermined purging operation is started after the adsorbing operation is terminated.

FIG. 4 is a diagram for showing a desorption behavior of NOx and HC existing if the intake purge is selected when a predetermined purging operation is started after the adsorbing operation is terminated. A mechanism itself concerning the desorption of HC and NOx in the intake purge is the same as that in the exhaust purge. However, an amount of the desorbed gas flowing back into the intake system is subject to a limitation because there is a need for suppressing a variation in combustion of the internal combustion engine 10. Therefore, a flow amount of the exhaust gas supplied to the HC/NOx adsorbent 22 during the intake purge is about ten percent of that during the exhaust purge.

As described above, the flow amount of the exhaust gas during the intake purge is low. Therefore, as shown in FIG. 4, a rise in temperature of the HC/NOx adsorbent 22 after the purge is started is slower than that during the exhaust purge, and peak value of the temperature is also smaller than that. As a result, the desorption behavior of HC is also slower than that during the exhaust purge, and peak value of the desorption amount of HC is also smaller than that.

In addition, a moisture amount supplied to the HC/NOx adsorbent 22 is smaller because the flow amount of the exhaust gas is lower. As a result, the desorption behavior of NOx during the intake purge is also slower than that during the exhaust purge, and peak value of the desorption amount of NOx is also smaller than that.

The advantages and the disadvantages between the exhaust purge and intake purge as described above are compared. The exhaust purge can allow the HC/NOx adsorbent 22 to supply a great amount of the exhaust gas, thereby adequately increasing the temperature of the HC/NOx adsorbent 22 to the temperature at which HC is perfectly desorbed. Accordingly, it is possible to desorb HC and NOx completely from the HC/NOx adsorbent 22. However, if the exhaust purge is performed immediately at a start timing of the purge after the predetermined adsorbing operation is terminated, the rapidly significant desorption of NOx that cannot cope within a purification capability of the second underfloor catalyst 30 occurs as described above.

In contrast, for the sake of consideration for the combustion, the intake purge can allow the HC/NOx adsorbent 22 to supply only a smaller amount of the exhaust gas than that during the exhaust purge. Therefore, it is difficult to increase the temperature of the HC/NOx adsorbent 22 adequately, and it is extremely difficult to desorb HC and NOx completely from the HC/NOx adsorbent 22. However, the intake purge can return HC and NOx desorbed to the intake system and burn them again. After that, it can purify HC and the like using the active front stage catalyst 14, the active underfloor catalyst 16, or the like. Consequently, this makes it possible to purify HC and NOx adsorbed in the HC/NOx adsorbent 22 during the cold start, with a purifying rate of approximately one hundred percent. In addition, the intake purge can suppress the moisture amount supplied to the HC/NOx adsorbent 22 to low levels eventually. Thus, according to the intake purge, the rapidly significant desorption of NOx that cannot cope within the purification capability of the second underfloor catalyst 30 does not occur contrary to the exhaust purge.

Characteristic Purging Operations of the First Embodiment

The present embodiment selects and executes the intake purge firstly when a purging operation is executed after the predetermined adsorbing operation is executed. Then, the present embodiment switches the intake purge to the exhaust purge, after a point (see "time point t0" shown in FIG. 4) in time when the purge (desorption) of NOx from the HC/NOx adsorbent 22 terminates has come, more specifically, at a period between the NOx purge termination time point t0 and a time point (see "time point t1" shown in FIG. 4) at which the adsorbent temperature becomes stable (saturate).

Figure 5:
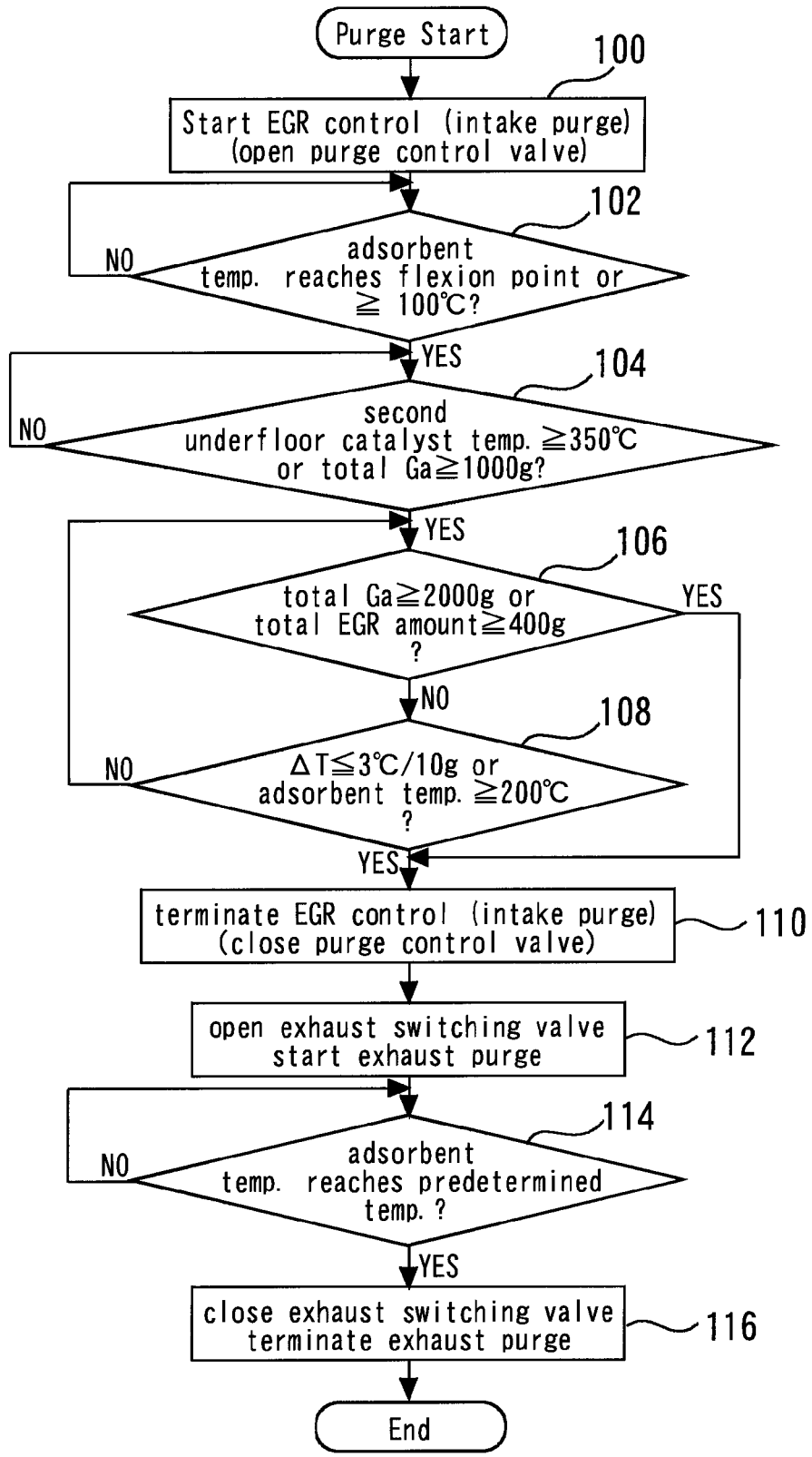
FIG. 5 is a flowchart illustrating a routine that is executed in the first embodiment of the present invention.

FIG. 5 is a flowchart illustrating a routine that the ECU 40 performs in the first embodiment in order to implement the above functionality. More specifically, the routine shown in FIG. 5 is started when predetermined purge start conditions are established after the predetermined adsorbing operation is executed during the cold start. As the routine shown in FIG. 5, step 100 is first performed to close the purge control valve 28 for the purpose of starting a EGR control (intake purging operation).

Next, step 102 is performed to judge whether either one of a judgment concerning whether the adsorbent temperature reaches a flexion point and a judgment concerning whether the adsorbent temperature is equal to or higher than one hundred degrees C. is established, for the purpose of judging whether the NOx purge termination time point ("time point t0" shown in FIG. 4) has come. The adsorbent temperature rises due to adsorption heat existing when the moisture replaces NOx and is adsorbed in the HC/NOx adsorbent 22. In step 102, a time point at which the temperature of the HC/NOx adsorbent 22 after the intake purge is performed reaches the flexion point is detected by the temperature sensor 24. Then, it is judged that the adsorption of the moisture to the HC/NOx adsorbent 22 is saturated and that the purge of NOx is completed, at the above time point.

If the judgment result obtained in step 102 indicates that the purge of NOx is completed, step 104 is performed to judge whether either one of a judgment concerning whether the temperature of the second underfloor catalyst 30 is equal to or higher than three hundred fifty degrees C. and a judgment concerning whether total intake air amount Ga is equal to or larger than one thousand grams is established. By such judgment in step 104, it is judged whether warm-up (activation) of the second underfloor catalyst 30 is completed, that is to say, whether a condition under which the HC purification capability of the second underfloor catalyst 30 is exerted is established. Incidentally, the total intake air amount Ga can be obtained by counting measured values of the intake air amount Ga with the air flow meter 42 from the start of the purge.

If the judgment result obtained in step 104 indicates that the warm-up of the second underfloor catalyst 30 is completed, step 106 is performed to judge whether at least one of a judgment concerning whether the total intake air amount Ga is equal to or larger than two hundred grams and a judgment total EGR amount (total intake purge gas amount) is equal to or larger than four hundred grams is established. By such judgment in step 106, it is judged whether maximum extension time point for the intake purging operation has come. Incidentally, the ECU 40 stores a map that defines what percentage of the EGR amount (intake purge amount) to the intake air amount Ga would be using the relationship among a load factor KL, an engine speed Ne, and the number (opening angle of the purge control valve 28) of EGR steps. In step 106, the total EGR amount is obtained by referring to such a map.

If the judgment in step 106 is not established, that is, if it can be judged that the maximum extension time point t2 for the intake purge has not come, step 108 is performed to judge whether either one of a judgment concerning whether an amount Δt of temperature change of the HC/NOx adsorbent 22 per unit total EGR amount (intake purge amount) is equal to or less than a predetermined value (for example, three degrees C./ten grams) and a judgment concerning whether the adsorbent temperature is equal to or higher than two hundred degrees C. is established. By such judgment, step 108 judges the time point t1 at which the adsorbent temperature increased by the intake purge after the NOx purge is completed becomes stable. Incidentally, a value in a state where the EGR control, which is performed over a predetermined time in series, is performed when an engine load is equal to or higher than a predetermined value is used as the amount Δt of temperature change. The time point t1 in step 108 at which adsorbent temperature becomes stable may be estimated on the basis of the total EGR amount in a state where the EGR control is performed when an engine load is equal to or higher than a predetermined value.

If the judgment in step 108 is not established, that is, if it can be judged that the adsorbent temperature does not yet become stable, step 106 is repeatedly executed. If, on the other hand, it can be judged in step 108 that the adsorbent temperature becomes stable, step 110 is next performed to close the purge control valve 28 for the purpose of terminating the EGR control (intake purge operation).

If, on the other hand, the judgment in step 106 is established, that is, if it can be judged that the maximum extension time point t2 for the intake purge has come, step 110 is performed to immediately terminate the EGR control (intake purging operation), even if the judgment in step 108 concerning whether the adsorbent temperature becomes stable is not established.

In the routine shown in FIG. 5, when the EGR control is terminated, step 112 is next performed to open the exhaust switching valve 20 (open the bypass passage 18) and start the exhaust purging operation.

Next, step 114 is performed to judge whether the adsorbent temperature reaches a predetermined temperature (for example, a temperature at which HC desorbs fully from the HC/NOx adsorbent 22). As a result, if it can be judged that the adsorbent temperature reaches the above predetermined temperature, step 116 is performed to close the exhaust switching valve 20 (open the main exhaust passage 12) and terminate the exhaust purging operation.

According to the routine that has been described above with reference to FIG. 5, not the exhaust purging operation but the intake purging operation is selected and executed until the purge (desorption) of NOx is completed. Therefore, it is possible to avoid the occurrence of the rapidly significant desorption of NOx that cannot cope within the purification capability of the second underfloor catalyst 30. This can avoid NOx desorbed from the HC/NOx adsorbent 22 from being exhausted without being purified by the second underfloor catalyst 30, and prevent exhaust emission from being deteriorated.

According to the routine described above, the intake purging operation is switched to the exhaust purging operation at a timing existing after the purge of NOx is completed and in principle at the time point t1 at which the temperature of the HC/NOx adsorbent 22 becomes stable. As described above, the desorption amount of HC is proportional to the adsorbent temperature. For this reason, the desorption amount of HC increases with an increase of the adsorbent temperature until the adsorbent temperature becomes stable, while the desorption amount of HC goes into a decline after the adsorbent temperature becomes stable. In addition, the intake purging operation described above can purify HC and NOx desorbed with a purification rate of approximately one hundred percent. In this respect, the intake purging operation is more favorable than the exhaust purging operation. To desorb HC promptly while preferably purifying HC and NOx, it is preferred that the intake purging operation be continued until the time point t1 at which the adsorbent temperature becomes stable comes. In this way, the above routine makes it possible to optimize a timing for switching the intake purging operation to the exhaust purging operation.

The adsorbent temperature rises with a supply of the moisture to the HC/NOx adsorbent 22 and reaches the flexion point when the adsorption amount of the moisture is saturated (that is, the purge of NOx is completed). After that, the adsorbent temperature rises with an increase of the exhaust gas temperature until the exhaust gas temperature becomes stable. According to the above routine, it is possible to preferably judge the NOx purge termination time point, that is, existence or nonexistence of the significant desorption of NOx, based on the amount of the moisture supplied to the HC/NOx adsorbent 22 during the intake purging operation.

According to the routine described above, the switching from the intake purging operation to the exhaust purging operation is restricted until the warm-up of the second underfloor catalyst 30 placed downstream of the other catalysts is completed and the condition under which the HC purification capability of the catalyst 30 is exerted is established. This makes it possible to prevent HC desorbed from the HC/NOx adsorbent 22 from being released into the atmosphere without being purified by the second underfloor catalyst 30.

In a state where the intake purging operation is executed after the purge of NOx is completed, a predetermined time necessary until the adsorbent temperature becomes stable and a temperature region in which the temperature becomes stable, change in accordance with running conditions of a vehicle driver. As a result, the adsorbent temperature in some cases may continue to increase moderately without stabilizing. If that happens, an operation of the internal combustion engine 10 is stopped before the purging operation of HC and NOx concerning the HC/NOx adsorbent 22 is completed. Consequently, there is a possibility that the HC/NOx adsorbent 22 becomes unable to adsorb HC and NOx adequately during the next cold start. In contrast, when the maximum extension time point for the intake purging operation has come, the above routine switches to the exhaust purge forcibly, even if the adsorbent temperature has not yet been stable. This can supply a great amount of the exhaust gas to the HC/NOx adsorbent 22 and avoid the operation of the internal combustion engine 10 from stopping before the purging operations are completed. Accordingly, it is possible to avoid HC and NOx from being not adsorbed adequately by the adsorbent during the next cold start.

The first embodiment, which has been described above, judges that the adsorption amount of the moisture to the HC/NOx adsorbent 22 is saturated, that is, that the purge of NOx is completed, when the temperature of the HC/NOx adsorbent 22 after the intake purging operation is executed reaches a certain flexion point. However, the method for judging the completion of the NOx purge (desorption) is not limited to the above, and the following alternative methods, for example, may be used. More specifically, a concentration of the moisture supplied to the HC/NOx adsorbent 22 by the intake purging operation may be directly obtained using a moisture concentration sensor and the purge termination time point of NOx may be judged on the basis of a product of the obtained moisture concentration and the total EGR amount. The purge termination time point of NOx can be also estimated on the basis of only the total EGR amount, because the concentration of the moisture contained in the exhaust gas at the stoichiometric operation is approximately fourteen percent and constant. Furthermore, the purge termination time point may be judged by directly measuring the desorption amount of NOx from the HC/NOx adsorbent 22 using a NOx sensor.

The first embodiment, which has been described above, applies to the system in which the bypass passage 18 is provided with the HC/NOx adsorbent 22 having a function of adsorbing HC and NOx. However, the system to which the present invention applies is not limited to such HC/NOx-simultaneous adsorption desorption system. Alternative systems which include an adsorbent having a function of adsorbing at least NOx may be used.

In the first embodiment, which has been described above, single HC/NOx adsorbent 22 is used as an adsorbent having a function of adsorbing HC and NOx. However, in the present invention, an HC adsorbent having a function of adsorbing HC and a NOx adsorbent having a function of adsorbing NOx may be independently configured. Furthermore, such an HC adsorbent and NOx adsorbent may be disposed in separate bypass passages.

The first embodiment, which has been described above, executes the intake purging operation until after the purge of NOx is completed. However, the present invention is not limited to the above embodiment with such intake purging operation. More specifically, an intake purging operation may be executed in at least part of a period during which the significant desorption of Nox occurs in accordance with supply of moisture to the adsorbent having a function of adsorbing NOx. Furthermore, as a preferred example, the intake purging operation may be executed until the desorption amount of NOx during the NOx significant desorption occurrence period (see FIG. 3) exceeds peak point. After that, the purging operations may be switched to the exhaust purge.

Incidentally, in the first embodiment, which has been described above, the exhaust switching valve 20 and the purge control valve 28 correspond to the "flow path switching means" according to the first to the fourth aspects of the present invention. In addition, the "intake purge execution means" according to the first to the fourth aspects of the present invention is implemented when the ECU 40 performs step 100; the "purging operation execution means" according to the first or the third aspect of the present invention is implemented when the ECU 40 performs steps 100 to 110; the "exhaust purge execution means" according to the second or the fourth aspect of the present invention is implemented when the ECU 40 performs steps 112 to 116; and the "purging operation switching means" according to the second or the fourth aspect of the present invention is implemented when the ECU 40 performs steps 100 to 112. In addition, the second underfloor catalyst 30 corresponds to the "catalyst" according to the second, the fourth, the eighth, or the ninth aspect of the present invention.

Further, the "moisture amount estimation means" and the "NOx significant desorption judgment means" according to the fifth aspect of the present invention are implemented when the ECU 40 performs step 102.

Further, the temperature sensor 24 corresponds to the "adsorbent temperature acquisition means" according to the sixth or the seventh aspect of the present invention.

Further, the "purging operation continuance means" according to the sixth aspect of the present invention is implemented when the ECU 40 performs step 110 if the judgment in step 108 is established.

Further, the "purge switching restriction means" according to the seventh aspect of the present invention is implemented when the ECU 40 performs steps 110 and 112 if the judgment in step 108 is established.

Further, the "purging operation continuance means" according to the eighth aspect of the present invention is implemented when the ECU 40 performs step 110 if the judgment in step 104 is established.

Further, the "purge switching restriction means" according to the ninth aspect of the present invention is implemented when the ECU 40 performs steps 110 and 112 if the judgment in step 104 is established.

Further, the "forcible purge execution means" according to the tenth aspect of the present invention is implemented when the ECU 40 performs steps 106 and 110.

The invention claimed is:

1. An exhaust gas purifying apparatus for an internal combustion engine, the apparatus comprising:
    a main exhaust passage through which exhaust gas exhausted from the internal combustion engine flows;
    a bypass passage branching off from the main exhaust passage at an upstream connecting portion connected to the main exhaust passage while merging again with the main exhaust passage at a downstream connecting portion provided downstream of the upstream connecting portion;
    flow path switching means that is capable of switching a flow target into which the exhaust gas flows between the main exhaust passage and the bypass passage;
    an adsorbent that is disposed in the bypass passage and has a function of adsorbing at least NOx of unpurified components contained in the exhaust gas;
    a catalyst that is disposed in the main exhaust passage and capable of purifying the exhaust gas;
    a purge passage branching off from the bypass passage while connecting to an intake passage of the internal combustion engine; and
    an electronic control unit programmed to execute
        an intake purge operation for controlling the flow path switching means so that part of the exhaust gas exhausted from the internal combustion engine is supplied from the main exhaust passage to the bypass passage and then passes through the adsorbent and then flows back into the intake passage via the purge passage;
        an exhaust purge operation for controlling the flow path switching means so that part or all of the exhaust gas exhausted from the internal combustion engine is supplied from the main exhaust passage to the bypass passage and then passes through the catalyst after passing through the adsorbent; and
        a purging switching operation for switching the intake purge operation to the exhaust purge operation after a point in time when a significant desorption of NOx from the adsorbent is completed.

2. An exhaust gas purifying apparatus for an internal combustion engine, the apparatus comprising:
    a main exhaust passage through which exhaust gas exhausted from the internal combustion engine flows;
    a bypass passage branching off from the main exhaust passage at an upstream connecting portion connected to the main exhaust passage while merging again with the main exhaust passage at a downstream connecting portion provided downstream of the upstream connecting portion;
    flow path switching means that is capable of switching a flow target into which the exhaust gas flows between the main exhaust passage and the bypass passage;
    an adsorbent that is disposed in the bypass passage and has a function of adsorbing HC and NOx contained in the exhaust gas;
    a catalyst that is disposed in the main exhaust passage provided downstream of the downstream connecting portion and capable of purifying the exhaust gas;
    a purge passage branching off from the bypass passage while connecting to an intake passage of the internal combustion engine; and
    an electronic control unit programmed to execute
        an intake purge operation for controlling the flow path switching means so that part of the exhaust gas exhausted from the internal combustion engine is supplied from the main exhaust passage to the bypass passage and then passes through the adsorbent and then flows back into the intake passage via the purge passage; and
        a purging operation using the intake purge operation in at least part of a period during which a significant desorption of NOx from the adsorbent occurs;
    wherein the purging operation includes a purging continuance operation for continuing the purging operation using the intake purge operation until an HC purification capability of the catalyst becomes able to be exerted.

3. An exhaust gas purifying apparatus for an internal combustion engine, the apparatus comprising:
    a main exhaust passage through which exhaust gas exhausted from the internal combustion engine flows;
    a bypass passage branching off from the main exhaust passage at an upstream connecting portion connected to the main exhaust passage while merging again with the main exhaust passage at a downstream connecting portion provided downstream of the upstream connecting portion;
    flow path switching means that is capable of switching a flow target into which the exhaust gas flows between the main exhaust passage and the bypass passage;
    an adsorbent that is disposed in the bypass passage and has a function of adsorbing HO and NOx contained in the exhaust gas;

a catalyst that is disposed in the main exhaust passage and capable of purifying the exhaust gas;

a purge passage branching off from the bypass passage while connecting to an intake passage of the internal combustion engine; and an electronic control unit programmed to execute an intake purge operation for controlling the flow path switching means so that part of the exhaust gas exhausted from the internal combustion engine is supplied from the main exhaust passage to the bypass passage and then passes through the adsorbent and then flows back into the intake passage via the purge passage;

an exhaust purge operation for controlling the flow path switching means so that part or all of the exhaust gas exhausted from the internal combustion engine is supplied from the main exhaust passage to the bypass passage and then passes through the catalyst after passing through the adsorbent; and a purging switching operation for switching the intake purge operation to the exhaust purge operation after a point in time when a significant desorption of NOx from the adsorbent is completed.

4. The exhaust gas purifying apparatus for the internal combustion engine according to claim 1, wherein the electronic control unit is programmed to further execute:

a moisture amount estimation operation for estimating a moisture amount supplied to the adsorbent during a purging operation; and a NOx significant desorption judgment operation for judging the significant desorption of NOx from the adsorbent based on the moisture amount estimated by the moisture amount estimation operation.

5. The exhaust gas purifying apparatus for the internal combustion engine according to claim 3, wherein the electronic control unit is programmed to further execute:

an adsorbent temperature acquisition operation for acquiring a temperature of the adsorbent;

wherein the purging switching operation includes a purge switching restriction operation for restricting the switching to the exhaust purge operation until the temperature of the adsorbent becomes stable.

6. The exhaust gas purifying apparatus for the internal combustion engine according to claim 3, wherein the catalyst is disposed in the main exhaust passage provided downstream of the downstream connecting portion; and wherein the purging switching operation includes a purging operation restriction operation for restricting the switching to the exhaust purge operation until an HC purification capability of the catalyst becomes able to be exerted.

7. The exhaust gas purifying apparatus for the internal combustion engine according to claim 5, wherein the purging switching operation includes a forcible purge operation for switching to the exhaust purge operation when total intake air amount totaled from start of a purging operation, total intake purge amount, or both exceeds a predetermined value, even if the temperature of the adsorbent has not yet been stable.

8. The exhaust gas purifying apparatus for the internal combustion engine according to claim 2, wherein the electronic control unit is programmed to further execute:

a moisture amount estimation operation for estimating a moisture amount supplied to the adsorbent during a purging operation; and a NOx significant desorption judgment operation for judging the significant desorption of NOx from the adsorbent based on the moisture amount estimated by the moisture amount estimation operation.

9. The exhaust gas purifying apparatus for the internal combustion engine according to claim 3, wherein the electronic control unit is programmed to further execute:

a moisture amount estimation operation for estimating a moisture amount supplied to the adsorbent during a purging operation; and a NOx significant desorption judgment operation for judging the significant desorption of NOx from the adsorbent based on the moisture amount estimated by the moisture amount estimation operation.

10. An exhaust gas purifying apparatus for an internal combustion engine, the apparatus comprising:

a main exhaust passage through which exhaust gas exhausted from the internal combustion engine flows;

a bypass passage branching off from the main exhaust passage at an upstream connecting portion connected to the main exhaust passage while merging again with the main exhaust passage at a downstream connecting portion provided downstream of the upstream connecting portion;

a flow path switching device that is capable of switching a flow target into which the exhaust gas flows between the main exhaust passage and the bypass passage;

an adsorbent that is disposed in the bypass passage and has a function of adsorbing at least NOx of unpurified components contained in the exhaust gas;

a catalyst that is disposed in the main exhaust passage and capable of purifying the exhaust gas;

a purge passage branching off from the bypass passage while connecting to an intake passage of the internal combustion engine; and an electronic control unit programmed to execute an intake purge operation for controlling the flow path switching device so that part of the exhaust gas exhausted from the internal combustion engine is supplied from the main exhaust passage to the bypass passage and then passes through the adsorbent and then flows back into the intake passage via the purge passage;

an exhaust purge operation for controlling the flow path switching device so that part or all of the exhaust gas exhausted from the internal combustion engine is supplied from the main exhaust passage to the bypass passage and then passes through the catalyst after passing through the adsorbent; and a purging switching operation for switching the intake purge operation to the exhaust purge operation after a point in time when a significant desorption of NOx from the adsorbent is completed.

11. An exhaust gas purifying apparatus for an internal combustion engine, the apparatus comprising:

a main exhaust passage through which exhaust gas exhausted from the internal combustion engine flows;

a bypass passage branching off from the main exhaust passage at an upstream connecting portion connected to the main exhaust passage while merging again with the main exhaust passage at a downstream connecting portion provided downstream of the upstream connecting portion;

a flow path switching device that is capable of switching a flow target into which the exhaust gas flows between the main exhaust passage and the bypass passage;

an adsorbent that is disposed in the bypass passage and has a function of adsorbing HC and NOx contained in the exhaust gas;

a catalyst that is disposed in the main exhaust passage provided downstream of the downstream connecting portion and capable of purifying the exhaust gas;

a purge passage branching off from the bypass passage while connecting to an intake passage of the internal combustion engine; and an electronic control unit programmed to execute an intake purge operation for controlling the flow path switching device so that part of the exhaust gas exhausted from the internal combustion engine is supplied from the main exhaust passage to the bypass passage and then passes through the adsorbent and then flows back into the intake passage via the purge passage; and a purging operation using the intake purge operation in at least part of a period during which a significant desorption of NOx from the adsorbent occurs;

wherein the purging operation includes a purging continuance operation for continuing the purging operation using the intake purge operation until an HC purification capability of the catalyst becomes able to be exerted.

12. An exhaust gas purifying apparatus for an internal combustion engine, the apparatus comprising:

a main exhaust passage through which exhaust gas exhausted from the internal combustion engine flows;

a bypass passage branching off from the main exhaust passage at an upstream connecting portion connected to the main exhaust passage while merging again with the main exhaust passage at a downstream connecting portion provided downstream of the upstream connecting portion;

a flow path switching device that is capable of switching a flow target into which the exhaust gas flows between the main exhaust passage and the bypass passage;

an adsorbent that is disposed in the bypass passage and has a function of adsorbing HC and NOx contained in the exhaust gas;

a catalyst that is disposed in the main exhaust passage and capable of purifying the exhaust gas;

a purge passage branching off from the bypass passage while connecting to an intake passage of the internal combustion engine; and an electronic control unit programmed to execute an intake purge operation for controlling the flow path switching device so that part of the exhaust gas exhausted from the internal combustion engine is supplied from the main exhaust passage to the bypass passage and then passes through the adsorbent and then flows back into the intake passage via the purge passage;

an exhaust purge operation for controlling the flow path switching device so that part or all of the exhaust gas exhausted from the internal combustion engine is supplied from the main exhaust passage to the bypass passage and then passes through the catalyst after passing through the adsorbent; and a purging switching operation for switching the intake purge operation to the exhaust purge operation after a point in time when a significant desorption of NOx from the adsorbent is completed.

* * * * *